D. COHEN.
SECTIONAL VIGNETTER.
APPLICATION FILED MAR. 3, 1915.
1,149,030.
Patented Aug. 3, 1915.
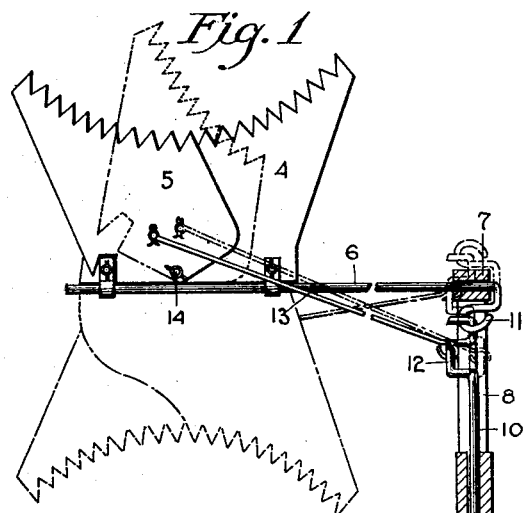
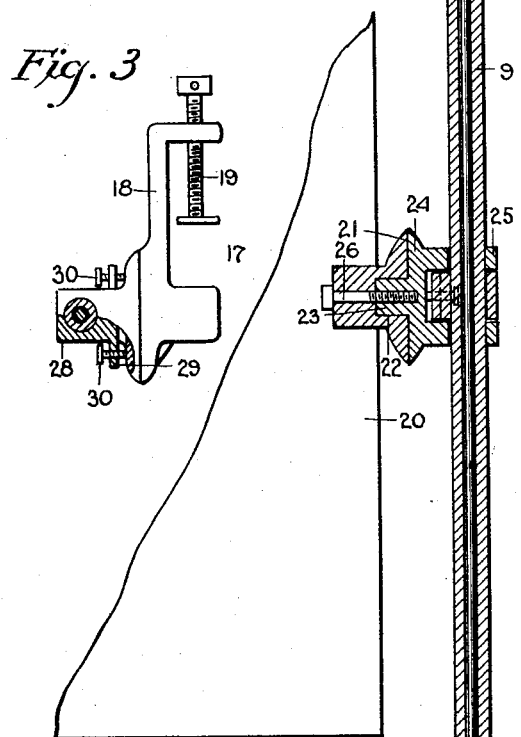
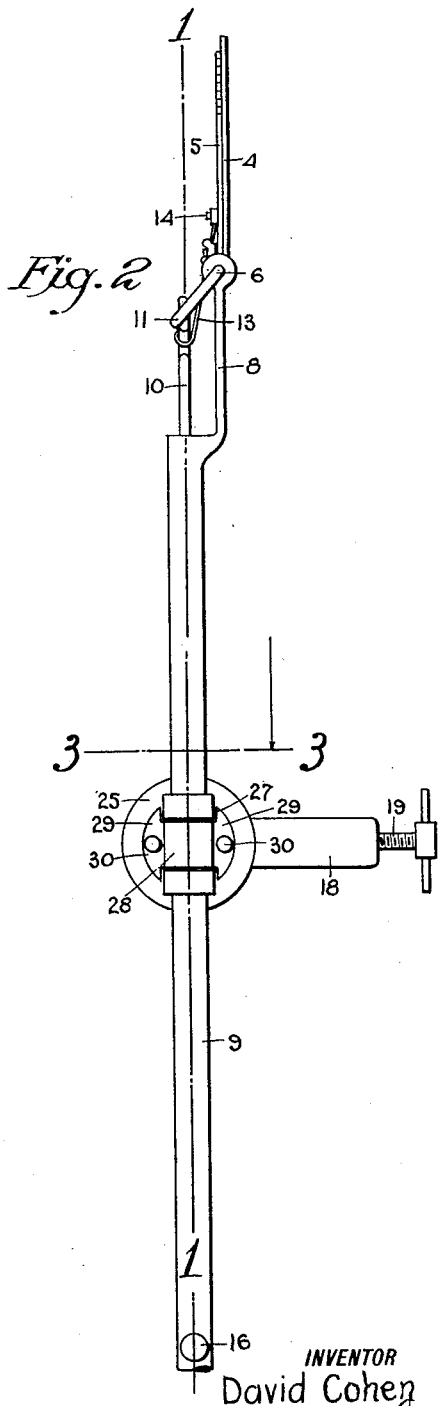
WITNESSES
INVENTOR
David Cohen
BY
ATTORNEYS

UNITED STATES PATENT OFFICE.

DAVID COHEN, OF NEW YORK, N. Y., ASSIGNOR OF ONE-HALF TO EDWIN E. MERSEREAU, OF NEW YORK, N. Y.

SECTIONAL VIGNETTER.

1,149,030. Specification of Letters Patent. Patented Aug. 3, 1915.

Application filed March 3, 1915. Serial No. 11,837.

*To all whom it may concern:*

Be it known that I, DAVID COHEN, a citizen of the United States, and a resident of the city of New York, borough of Brooklyn, in the county of Kings and State of New York, have invented a new and Improved Sectional Vignetter, of which the following is a full, clear, and exact description.

My invention relates to sectional vignetters to be used in connection with a photographic camera.

The object of the invention is to provide a simple, convenient, strong and inexpensive vignetter the curvature of which can be easily changed and the angular relation of which to the lens of the camera can also be easily varied.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views, and Figure 1 is a plan view of the device showing the details of construction; Fig. 2 is a side view thereof; and Fig. 3 is a detail structure of a clamp for attaching the device to a camera.

Referring to the drawings, 4 and 5 represent two sections forming together the vignetter. The section 4 is rigidly connected to an arm 6; while the section 5 is pivotally mounted on the section 4 adjacent the arm 6. The arm 6 is mounted to turn in a bearing 7 of the extension 8 of a tubular support 9. The extension 8 is offset from the axis of the support 9 to accommodate an actuating rod 10 mounted to slide and rotate in the axis of the support 9. The end of said rod is hooked into an eye 11 forming part of a crank which forms an integral part of the arm 6. When the rod 10 is displaced axially in the support 9, the vignetter, formed of the sections 4 and 5, is caused to rotate with the arm 6, as shown in dotted line in Fig. 1, the lower position of the vignetter indicating such a displacement. The actuating rod 10 is also provided with a crank 12 adjacent its end engaging the crank of the arm 6. Engaging the crank 12 is a rod 13 in pivotal engagement with the vignetter section 5. When the actuating rod 10 is turned within the support 9, the crank 12 will carry therewith the rod 13, and, consequently, displace the vignetter section 5 on its pivot 14 relative to the fixed section 4 and thus vary the angle of curvature of the vignetter, as indicated in dotted line in the upper portion of Fig. 1. To facilitate the operation of the actuating rod 10, the end thereof projecting out of the support 9 is provided with a head 15. A set screw 16 is also provided for locking the rod within the support and preventing accidental displacement thereof, and, consequently, the displacement of the vignetter.

The support 9 can be clamped in any suitable way to the camera, but preferably a clamp 17 is provided. The bracket 18 of the clamp has a screw 19 whereby the bracket can be attached to the camera board 20. The bracket 18 has a faced portion 21 which is provided with a central recess 22 engaged by a projection 23 of a similar faced portion 24 forming a bearing 25 for the support 9. A bolt 26 connects the bearing 25 to the bracket and constitutes the axis on which the bearing can be rotated relatively to the bracket. The support 9 is free to slide in the bearing 25. The said bearing has a cut-out 27 for accommodating a member 28 slidably mounted on the support 9, but prevented from moving relatively to the bearing 25 by the portions of the bearing engaging the support at each side of the member 28. The member has also wings 29 extending forward and rearward and engaging the bearing portions, whereby the member 28 is prevented from turning relatively to the bearing 25. Each of the wings 29 carries a screw 30 whereby the member 28 can be moved to and from the bearing support 25, and the support 9 can be clamped in the bearing 25.

From the foregoing description, taken in connection with the accompanying drawings, the advantage of the construction and operation of the device shown will be readily understood by those skilled in the art to which the invention pertains; and while I have described the principle of operation, together with the device which I now consider the best embodiment thereof, I desire to have it understood that the device shown is merely illustrative and that such changes may be made as are within the scope of the appended claims.

Having thus described my invention, I claim as new and desire to secure by Letters Patent:

1. In a sectional vignetter, an arm mounted to rotate, a vignetter section secured to the arm, another vignetter section pivotally connected to the first vignetter section, means for turning the arm, and means connecting the pivoted vignetter section to the means for turning the arm, said connection being such that said pivotally-mounted vignetter section can be moved relative to the vignetter on said arm without turning the arm, and vice versa.

2. In a sectional vignetter, an arm mounted to rotate, a vignetter section secured to the arm, another vignetter section pivotally connected to the first, means mounted to slide and rotate connected to said arm, the sliding movement of said means causing the turning of the arm, and a rod connecting the pivotally connected vignetter section to said means, the turning movement of said means causing a relative displacement of said pivotally mounted vignetter relative to the first vignetter section.

3. In a sectional vignetter, a support, an arm at right angles to the support mounted to turn therein, an actuating rod mounted to slide in said support, said arm having a crank engaged by said rod, the sliding movement of said rod causing the turning of said arm, a vignetter section secured to the arm, a second vignetter section pivotally connected to the first, said rod having a crank formed therein, and a connecting rod from the pivotally connected vignetter section to said crank in the rod, the turning movement of said actuating rod causing a relative displacement of the pivotally connected vignetter section relative to the secured vignetter section, and means for locking said actuating rod to said support.

4. In a sectional vignetter, a pair of vignetter sections mounted to swing together and relative to one another, means for swinging them together and relative to one another simultaneously or independently, a clamp for securing said sectional vignetter, comprising a rotating member having means in which said means for swinging the vignetters is slightly mounted, and means for locking said means for swinging the vignetters and said rotating member.

5. In a sectional vignetter, a support, an arm at right angles to the support mounted to turn therein, an actuating rod mounted to slide and rotate in said support, said arm having a crank engaged by said actuating rod, the sliding movement of said actuating rod causing the rotation of said arm, a vignetter section carried by said arm and constrained to move therewith, another vignetter section pivotally connected to the first vignetter section, said actuating rod having a crank, a connecting rod pivotally connecting said pivotally connected vignetter section to the crank in the actuating rod, the turning movement of the actuating rod causing the pivotally mounted vignetter section to swing on its pivot relative to the vignetter section secured to the rod, means for locking said actuating rod to the support, and a clamp slidably engaging said support whereby the device can be attached, said clamp having means for locking said support to the clamp.

6. In a sectional vignetter, a tubular support having at one end thereof an off-set extension, an arm extending laterally from said support at right angles thereto and bearing with one end in said extension of the support, said arm having a crank at the bearing of the extension, a rod mounted to slide and turn within the tubular support and engaging with one end the crank of the arm, said rod having a crank adjacent its engagement with the crank of the arm, a vignetter section rigidly connected to said rod, another vignetter section pivotally connected to the first vignetter section, a connecting rod having one end thereof in pivotal connection with the pivotally connected vignetter section, the other end of said connecting rod engaging the crank of the rod mounted to slide and turn in the support, the turning movement of said rod causing a swinging of the pivotally connected vignetter section relative to the other vignetter section, the sliding movement of said rod causing the turning of the arm and therefore the swinging movement of the two vignetter sections in a plane at right angles to the relative movement of said vignetter sections, means for locking said rod to the support, a clamp for securing said support, said support being mounted to slide and turn in said clamp, and means for locking said support to the clamp.

7. In a sectional vignetter, a pair of vignetter sections mounted to swing together and relative to one another, means for swinging the vignetters together or relative to one another simultaneously or independently, the swinging movement of the vignetters relative to one another being in a plane at right angles to the combined swinging movement of the vignetters, a clamp associated with said means for swinging the vignetters for securing the same, said means for securing the vignetters being mounted to turn and slide in said clamp, and locking means associated with the clamp for locking said swinging means to said clamp, substantially as and for the purpose set forth.

In testimony whereof I have signed my name to this specification in the presence of two subscribing witnesses.

DAVID COHEN.

Witnesses:
SAMUEL LEVIN,
LOUIS ROGALL.

Copies of this patent may be obtained for five cents each, by addressing the " Commissioner of Patents, Washington, D. C."